United States Patent
Enamandram et al.

(10) Patent No.: US 12,411,689 B2
(45) Date of Patent: Sep. 9, 2025

(54) METHOD TO REDUCE REGISTER ACCESS LATENCY IN SPLIT-DIE SoC DESIGNS

(71) Applicant: Intel Corporation, Santa Clara, CA (US)

(72) Inventors: Anand K. Enamandram, Folsom, CA (US); Eswaramoorthi Nallusamy, Cedar Park, TX (US); Ramamurthy Krithivas, Chandler, AZ (US); Cheng-Wein Lin, Portland, OR (US); Irene Johansen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 666 days.

(21) Appl. No.: 17/552,843

(22) Filed: Dec. 16, 2021

(65) Prior Publication Data

US 2022/0107808 A1    Apr. 7, 2022

(51) Int. Cl.
G06F 9/30        (2018.01)
G06F 9/38        (2018.01)

(52) U.S. Cl.
CPC ........ *G06F 9/30101* (2013.01); *G06F 9/3863* (2013.01)

(58) Field of Classification Search
None
See application file for complete search history.

(56) References Cited

U.S. PATENT DOCUMENTS

| | | | |
|---|---|---|---|
| 8,635,380 B2 | 1/2014 | Harikumar et al. | |
| 2018/0349650 A1 | 12/2018 | Shah et al. | |
| 2019/0103872 A1* | 4/2019 | Clark | H03K 19/1776 |
| 2020/0301830 A1 | 9/2020 | Abraham et al. | |
| 2020/0373235 A1 | 11/2020 | Collins et al. | |
| 2021/0097013 A1 | 4/2021 | Saleh et al. | |

OTHER PUBLICATIONS

International Search Report and Written Opinion for PCT Patent Application No. PCT/US22/48279, Mailed Mar. 3, 2023, 11 pages.

* cited by examiner

*Primary Examiner* — Scott C Sun
(74) *Attorney, Agent, or Firm* — Compass IP Law PC (57) ABSTRACT

Methods and apparatus to reduce register access latency in split-die SoC designs. The method is implemented on a platform including a legacy socket and one or more non-legacy (NL) sockets comprising split-die System-on-Chips (SoC)s including multiple dielets interconnected with a plurality of Embedded Multi-Die Interconnect Bridges (EMIBs). The dielets include core dielets having cores, cache controllers and memory controllers. The method provides an affinity between a control and status registers (CSRs) memory range for the NL sockets such that CSRs in the memory controllers for multiple core dielets are programmed using transactions forwarded along core-to-cache controller datapaths that avoid crossing EMIBs. In one aspect, a transient map of address ranges is created that includes a respective Sub-NUMA Cluster (SNC) range allocated for the NL sockets, with a range of CSR addresses for accessing CSRs in the memory controllers for the NL sockets being stored in the respective SNC ranges.

20 Claims, 7 Drawing Sheets

Fig. 1

| SNC Mapping
Non Legacy Socket 1 Point of View — 202 | SNC Mapping
Legacy Socket 0 Point of View — 204 | Overall System View — 206 |
|---|---|---|
| | | MMIO High for All Sockets
3TB-4TB — 208 |
| (4GB to 4TB) is
"Remote" Memory from Socket 1 Point-of-View
Hence, any access by BSP in S1 to [4GB-4TB] will be hashed across all available CHAs and cause EMIB Crossings
218 | (4GB to 4TB) is
Unmapped in Socket 0
Any access by BSP Residing in [S0] will be hashed across all CHA's & cause EMIB Crossings
220 | Unmapped Ranges
4GB-3TB
210 |
| (0-4GB) is
"Remote" Memory from Socket 1 Point-of-View
Hence, any access by BSP in S1 to [0-4GB] will be hashed across all available CHAs and cause EMIB Crossings
222 | Socket 0, SNC Cluster 0
Any access by BSP core in [S0, SNC Cluster 0] to 0-4GB range will be affinitized and does not cause any EMIB Crossings
224 | S1 Ubox CSR Range (8MB) — 214
S0 Ubox CSR Range (8MB) — 216
0-4GB Legacy Range
212 |

METHOD TO REDUCE REGISTER ACCESS LATENCY IN SPLIT-DIE SoC DESIGNS

BACKGROUND INFORMATION

Historically, central processing units (CPUs), aka processors have employed a monolithic die design. Under early generations, operations such as memory access and Input/Output (IO) access were separated from the CPU using a chipset, such as a Northbridge-Southbridge chipset. As CPUs designs evolved, more of this functionality was added to the CPU using a System-on-Chip (SoC) design.

As core counts continue to scale and integrated circuit technology advancements produce finer-grained features, the transistor counts on a single die have reached 10's of billions. However, the dies for these SoCs require very expensive manufacturing equipment and design costs and the effective per/die cost is increased by reduced yields that statistically result as a function of transistor and core counts. Also, chip yield drops roughly exponentially as the chip area grows. It is also difficult and costly to redesign SoCs, as changes also have to be made to manufacturing processes and equipment associated with such redesigns.

A recent approach to address this is the use of "dielets," which, as the name implies, are smaller-size dies that are integrated in an SoC using a fabrication method such as using silicon-interconnect fabric (Si-IF). (Some artisans may use the term "chiplet" rather than "dielet," with the recognition that chiplets are not separate chips; for consistency, the term "dielet" is used herein.) These SoCs are called various names, including "Split-Die" SoCs herein. The use of modular dielets will enable an SoC manufacturer to offer variants within a processor family at a significantly lower cost than having to employ a single die for each variant. Also, instead of having to redesign an entire SoC, the redesign could apply to a dielet within the split-die SoC.

While split-die SoCs provide advantages, working with them presents new challenges that aren't present with single die SoCs. For example, split-die SoC designs suffer from longer transaction latencies when there are one or more Embedded Multi-Die Interconnect Bridge (EMIB) crossings required to complete a transaction. This is an industry-wide problem inherent to current split-die SoCs designs as well as Server CPUs that contain multiple dielets within a CPU Package interconnected by EMIB's or an equivalent interface. In particular, Non-Coherent (NC) transactions such as Configuration Space Register (CSR) Reads/Writes in such designs suffer from larger latency penalties compared to other coherent transaction types. Hence, while executing code that is dominant in NC CSR Transactions, the aggregate latency penalty increases significantly.

A key scenario that is impacted by this phenomenon is BIOS DDR5 (Double Data-Rate 5$^{th}$ generation) memory training time. For example, for one recent SoC under development the DDR5 training algorithms necessitate 1 Billion+CSR accesses per socket, which increases memory training time by 300%-400% compared to prior processor generations, adversely affecting overall Platform Cold Boot Time.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods to reduce register access latency in Split-Die SoC designs and associated apparatus are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Figure 1:
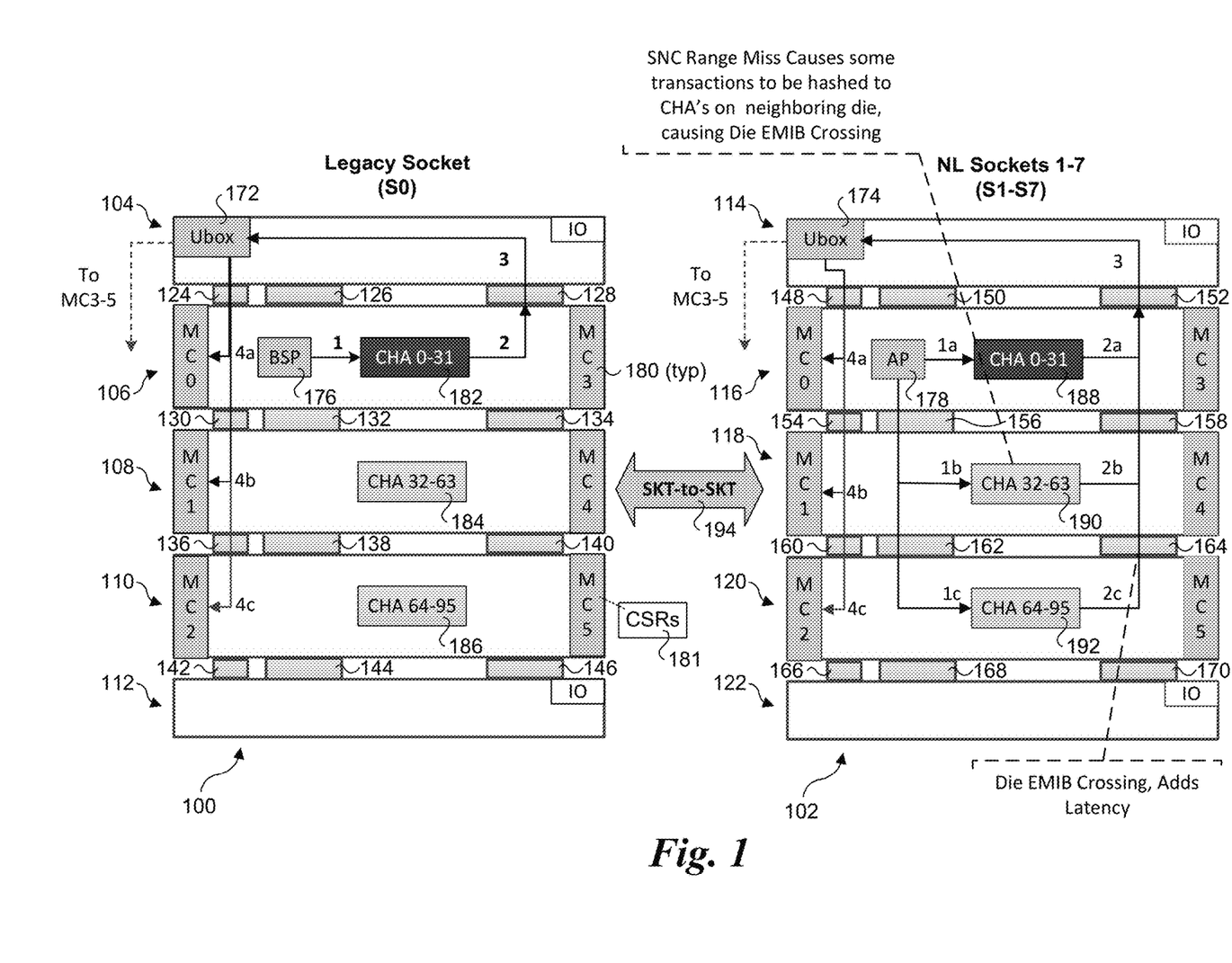
FIG. 1 is an abstracted view of a multi-socket platform including a legacy socket a non-legacy socket showing the forwarding path of transactions used to access CSRs in memory controllers on multiple core dielets with CHAs, where the transaction forwarding paths for the NL sockets employ core-to-CHA paths that cross Embedded Multi-Die Interconnect Bridges (EMIBs) connected between core dielets.

FIG. 1 shows an abstracted view of a multi-socket platform focusing on a "legacy" socket 100 (also referred to as socket 'S0') and one or more "non-legacy" sockets 102 (also referred to herein sockets 'S1'-'S7'). For illustrative purposes, a two-socket platform is depicted in the Figures herein; however, this is merely exemplary, as the number of sockets can be two or greater. For historical and other reasons, an SoC comprising a CPU or processor is referred to as a "socket," and thus reference to the sockets herein are referring to split-die SoCs that would be installed in an associated socket (for a Pin Grid Array (PGA) SoC package) or mounted to a printed circuit board (PCB) or the like using a Ball Grid Array (BGA) SoC package. Other packages may also be used.

In some embodiments, a multi-socket platform employs a Non-Uniform Memory Access (NUMA) architecture. Under a NUMA architecture, each socket has its own "local" memory resources (e.g., memory devices such as DDR5 DIMMs (Dual Inline Memory Modules)) that are accessed via one or more integrated memory controllers in the SoC. In some respect as applied to local memory access, a given socket operates in a manner similar to a computer or server with a single CPU. In addition to memory devices, the socket will include a cache hierarchy comprising multiple levels of cache. For example, in some embodiments the cache hierarchy includes a local Level 1 (L1) and Level 2 (L2) cache for each core, along with a Last Level Cache (LLC). In some embodiments the LLC is "sliced," meaning there is an instance of a portion of the LLC proximate to each core, while the LLC operates (in some respects) as a unified, distributed entity. In some embodiment, in L2 cache is referred to as a Mid-Level Cache (MLC). The cache hierarchy, along with the local memory, is operated as a coherent memory domain through use of a memory/cache coherency protocol, such as MESI (Mutual, Exclusive, Shared, Invalid) or MESIF (MESI+Forward) protocol, although other memory/cache coherency protocols may be used.

Under the NUMA architecture, a given socket can access the local memory for another socket using one or more socket-to-socket interconnects. This requires sending messages or the like over the socket-to-socket interconnect(s), which results in additional latency. Thus, the memory access is non-uniform relative to local memory access for the socket, hence the name NUMA. To manage memory on a system or platform-wide basis NUMA employs a global virtual memory space for the system memory. In a fully globalized environment, any socket can access any memory device. Under other architectures, cores on some sockets may have restricted access to only a portion of the system memory address space.

Returning to FIG. 1, each of sockets 100 and 102 employ a split-die SoC employing multiple dielets. For example, socket 100 includes a first IO dielet 104, three core dialets 106, 108, and 110, and a second IO dielet 112. Similarly, socket 102 includes three core dialets 116, 118, and 110 sandwiched between IO dielets 114 and 122. The various dielets are interconnected by EMIBs, as depicted by EMIBs 124, 126, 128, 130, 132, 134, 136, 138, 140, 142, 144, and 146 for socket 100 and EMIBs 148, 150, 152, 154, 156, 158, 160, 162, 164, 166, 168, and 170 for socket 102. Further details of EMIBs are described and illustrated below for FIG. 7.

An IO dielet may provide various functions including functions relating to IO operations. There is also an IO dielet for each socket in a platform or system that includes a configuration agent called a "Ubox" (utility box) as shown by a Ubox 172 for IO dialet 104 and a Ubox 174 for IO dialet 114. The UBox acts as the centralized unit for a variety of non-coherent type of transactions and functions. This includes dispatching interrupts to the appropriate cores and decoding and routing transactions to "uncore" registers—that is, registers that are not associated with processor/CPU cores. The uncore registers include memory controller CSRs.

Each of the core dialets include multiple cores with associated L1/L2 caches and LLC "slices" that are not shown in FIG. 1 for simplicity. A core among the multiple cores is employed as a Bootstrap Processor (BSP) for each of sockets 100 and 102, as shown by a BSP 176 in core dialet 106 and an application processor (AP) 178 in core dialet 116. A core dialet further includes a pair of memory controllers (MCs) 180, also labeled MC0, MC1, MC2, MC3, MC4, and MC5 in the Figures herein. Generally, a core dialet may include one or more memory controllers, under different embodiments.

Core dielets further include Caching and Home Agents (CHAs). The CHAs comprise cache controllers that are configured to effect cache-related operations, including maintaining memory coherency using a distributed set of agents. In the illustrated embodiment, there are 32 CHAs per core dialet, as depicted by CHAs 182, 184, and 186 for socket 100 and CHAs 188, 190, and 192 for socket 102. Of course, the number 32 is merely exemplary and non-limiting.

As mentioned above, the sockets in a multi-socket platform are interconnect by socket-to-socket interconnects, such as depicted by a socket-to-socket interconnect 194 between legacy socket 100 and NL socket 102. The socket-to-socket interconnects provide high-bandwidth low-latency interconnects. In one embodiment, socket-to-socket interconnect 194 comprises a Ultra Path Interconnect (UPI) interconnect.

Each of memory controllers 180 include a large number of memory controller registers comprising control/status registers (CSRs) 181. These memory controller registers reside in the local Ubox Memory Mapped IO (MMIO) range, and are accessed heavily during memory training. Each socket has its local Ubox MMIO range, which has a size of 8 MB in one embodiment. MMIO enables an agent, such as Ubox, to access CSRs using message transfers that are independent of CPU operations (e.g., do not require execution of code on a core to effect a memory/register transaction.

Under one existing approach, the UBox MMIO Ranges for all the sockets in a platform are lumped together in the 0-4 GB (GigaByte) range by convention. The entire 0-4 GB Low Memory range belongs to Sub-NUMA Cluster (SNC) Cluster 0 of Socket 0 (Legacy Socket). Sub-NUMA Clustering is an affinitization mode that allows for affinitization of the Core (BSP) and the CHA instances that the transactions are hashed to, thereby guaranteeing that EMIB crossings are avoided for all Core→CHA traversals. Therefore, since the Ubox MMIO Ranges for all the sockets is entirely within SNC Cluster 0 of legacy socket S0 (socket 100 in FIG. 1), EMIB crossing that might result for Core→CHA traversals are guaranteed to be avoided.

Figure 2:
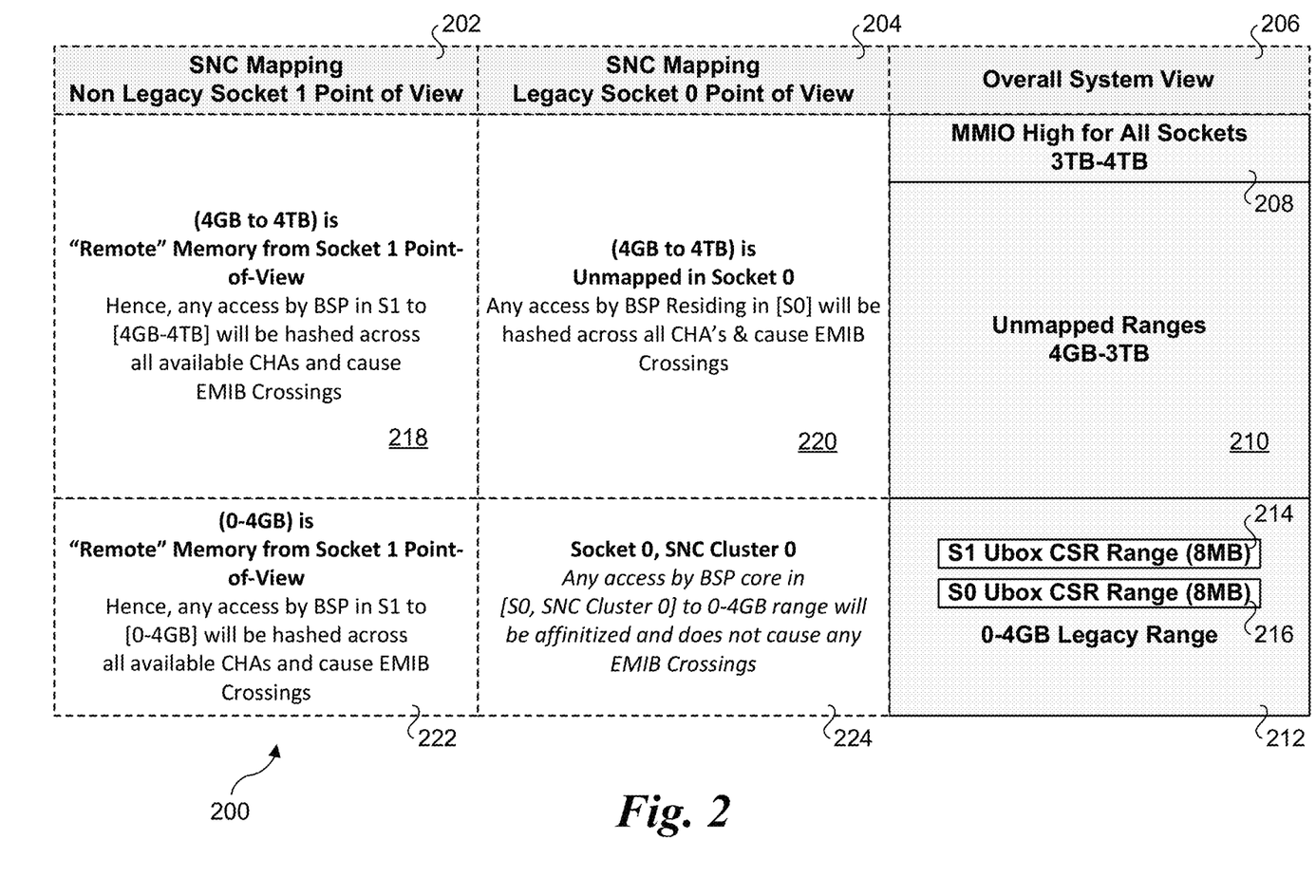
FIG. 2 shows a pre-MRC (Memory Reference Code) system address map under one embodiment of a current approach.

FIG. 2 shows a table illustrating a pre-MRC system address map 200 under one embodiment of a current approach. During this phase, a BIOS/Firmware module comprising Memory Reference Code (MRC) that is responsible for training and initializing DRAM memory (e.g., system memory) is executed. The table columns include an SNC mapping for non-legacy socket 1 column 202, an SNC mapping for legacy socket 0 column 204, and an overall system view column 206. From the overall system view, the virtual memory space for the system memory is mapped into three regions. As shown in a cell 208, the 3 TB-4 TB range is used as the MMIO high range for all sockets. As shown in a cell 210, the memory range from 4 GB-3 TB is initially unmapped. As shown in a cell 212, the memory range from 0-4 GB is the legacy range. Each of the non-legacy Socket 1 Ubox CSR range 214 and the legacy Socket 0 CSR range 216 are within the 0-4 GB legacy range. In the illustrated embodiment, both of the Socket 1 and Socket 0 CSR ranges is 8 MB, although this is merely exemplary and non-limiting.

Cells 218 and 220 are applicable to the 4 GB to 4 TB virtual memory range, while cells 222 and 224 are applicable to the 0-4 GB legacy range. As shown in cell 218, from the viewpoint of Socket 1 all memory from 4 GB to 4 TB is initially considered (pre-MRC) remote memory. As a result, any access by the BSP for Socket 1 for a memory address from 4 GB to 4 TB will be hashed across all available CHAs and cause EMIB crossings. Similarly, as shown in cell 222, all memory from 0-4 GB is initially considered remote memory. As before, any access by the BSP for Socket 1 for a memory address within 0-4 GB will be hashed across all available CHAs and cause EMIB crossing.

Cells 220 and 224 in legacy socket 0 column 204 show the SNC mapping from the viewpoint of the legacy Socket 0. In this case, the 4 GB to 4 TB memory range is initially unmapped in Socket 0. Thus, any access by the BSP for Socket 0 for a memory address from 4 GB to 4 TB will be hashed across all available CHAs and cause EMIB crossing. In contrast, as shown in cell 224, Socket 0 is part of SNC Cluster 0. Thus, any access by BSP core in [S0, SNC Cluster 0] to the 0-4 GB legacy range will be affinitized and does not cause any EMIB Crossings.

The foregoing access patterns are illustrated in FIG. 1. First, let's begin with the legacy socket S0. The objective during this pre-MRC stage is to program the CSRs in the memory controllers for socket S0. To accomplish this, BSP 176 needs to access the register space for each of memory controllers 180 in socket S0. For illustrative purposes, accesses to memory controllers MC0, MC1, and MC2 are shown. A similar access pattern would apply to memory controllers MC3, MC4, and MC5, as shown by "To MC3-5."

From the perspective of the cache system for a socket, the CSR access requests are handled in a manner similar to a regular memory request, as the CSRs for legacy socket S0 are within the 0-4 GB legacy range, as shown in FIG. 2 and described above. To program each CSR, BSP 176 will issue a non-coherent (NC) transaction containing the address of the CSR to access. Circuitry in BSP 176 will hash the transaction's destination memory address to a CHA among CHAs 182 and will be forwarded to that CHA, as depicted by a first path segment '1'. That CHA will recognize the memory transaction is an NC transaction that needs to be handed by the Ubox for the socket (Ubox 172). Thus, the NC transaction is forwarded from the CHA to Ubox 172 using the second and third datapath segments '2' and '3' shown, which will involve an EMIB crossing 128. Upon receipt of the NC transaction, Ubox 172 will determine which of memory controller MC0, MC1, or MC2 the CSR address in the NC transaction corresponds to and forward the NC transaction to the appropriate memory controller. This is depicted by a path segment '4a' to MC0, a path segment '4b' to MC1, and a path segment '4c' to MC2. Depending on the destined memory controller MC0, MC1, or MC2, one or more EMIB crossings will occur, including at least EMIB crossing 124.

In contrast to legacy socket S0, many more EMIB crossings are incurred when accessing/programming the memory controller CSRs for non-legacy socket S1, which adds substantially latency. As described above and shown in FIG. 2, S1 Ubox CSR range 214 is within the 0-4 GB legacy range. However, as shown in cell 222, from the viewpoint of a non-legacy socket such as S1, the 0-4 GB legacy range is outside the SNC range of socket 1 and is handled as "remote" memory. Thus, since targeted addresses are outside the SNC range of socket 1, the NC transaction is sent/hashed across all available CHAs of socket 1 (CHAs 188, 190, and 192). Accordingly, when AP 178 issues a NC transaction to access a CSR in one of the memory controllers for socket S1, the address will be hashed across all available CHAs and cause additional EMIB Crossings. This is depicted as a path segment '1a' going to CHAs 188, a path segment '1b' going to CHAs 190, and a path segment '1c' going to CHAs 192. As further shown, the path between AP 178 and CHAs 190 traverses EMIB crossing 156, while the path between AP 178 and CHAs 190 traverse both EMIB crossing 156 and EMIB crossing 162.

As discussed above, NC transactions are handled by the Socket's Ubox, which in the case of socket S1 is Ubox 174. Thus, upon receiving an NC transaction, the CHA will recognize that it needs to be forwarded to Ubox 174 and forward the NC transaction via applicable datapath segments, as depicted by datapath segments '2a', '2b', '2c' and 3. Path segment 3 includes EMIB crossing 152. Path segment '2b' further includes EMIB crossing 158, and path segment '2c' includes both EMIB crossing 158 and EMIB crossing 164. Once the NC transaction is received by Ubox 174, it is forward to the applicable memory controller MC0, MC1, or MC2 using respective path segments '4a', '4b' and '4c' in a manner similar to legacy socket S0.

The foregoing additional EMIB crossings will apply to all non-legacy sockets in addition to NL socket S1 for platforms with more than on NL socket. The net effect is an increase in average CSR access latency for NL Sockets, contributing to increased Memory Training/Cold Boot Times.

The fundamental bottleneck for the NL sockets under the approach illustrated in FIGS. 1 and 2 is the lack of affinity between the BSP Core and the CHA instances the addresses are hashed to. As discussed above, Sub-NUMA Clustering is an affinitization mode that allows for affinitization of the Core (SBSP) the CHA instances that the transactions are hashed to, thereby guaranteeing that EMIB crossings are avoided for all Core→CHA traversals.

Figure 3:
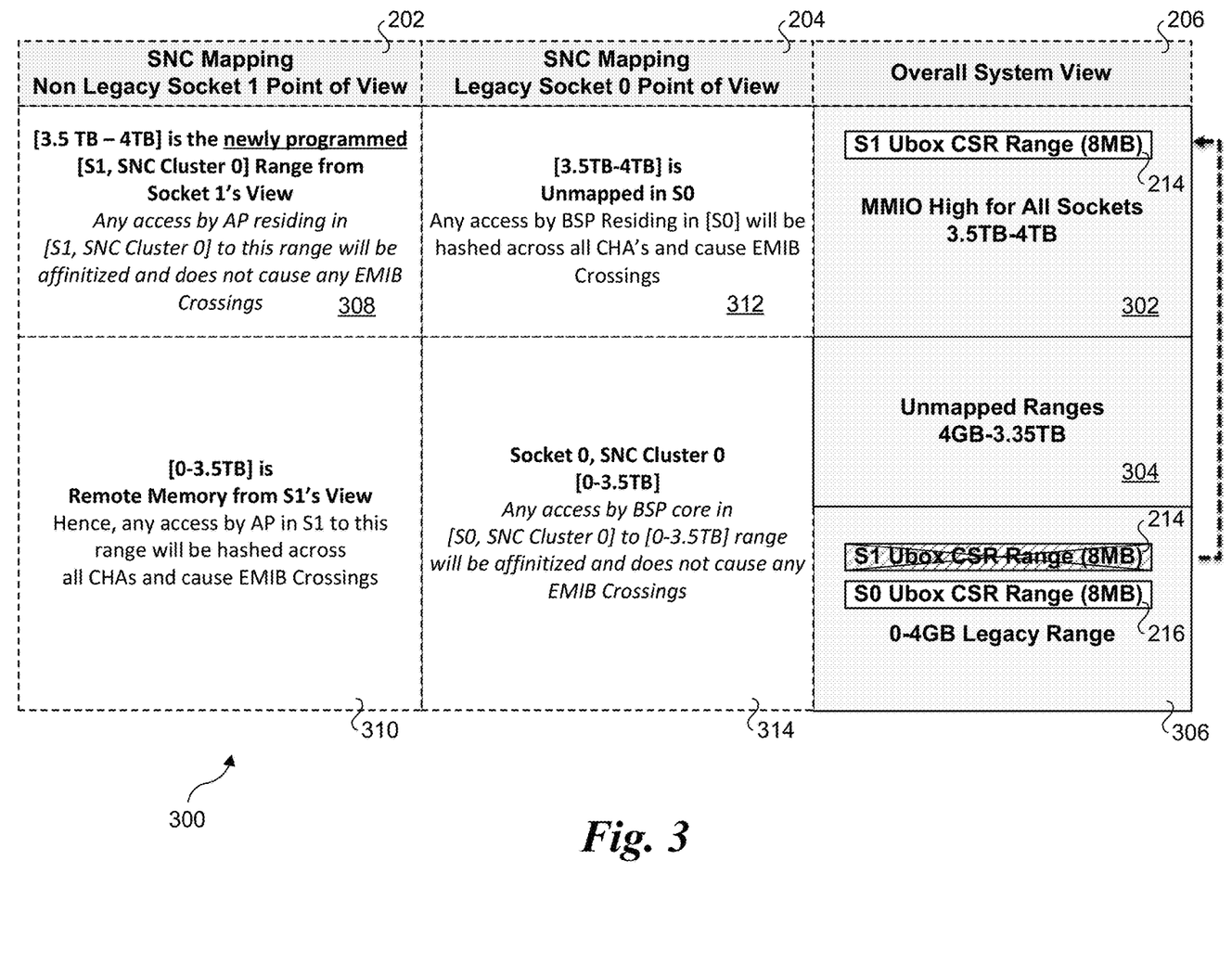
FIG. 3 is a pre-memory transient address map that is set up during memory training to guarantee that the CSR accesses in NL sockets are sent only to local CHAs on the same core dielet as the bootstrap processor (BSP) core for the NL sockets.

Under aspects the following embodiments, a solution to the foregoing problem is provided that employs a novel Pre-Memory Transient System Address Map under which each NL socket's Ubox MMIO range (e.g., ["S1 Ubox CSR Range (8 MB)") is moved out of the legacy socket's SNC0 range and placed in a newly created SNC0 range of NL Sockets (Sockets 1-7), as shown in FIG. 3 below. Now, when an NL socket's core accesses the local Ubox MMIO range, every CSR access results in an "SNC Range Hit". Thereby, the access is hashed and sent only to the CHAs co-located with the originating core for the transactions, avoiding EMIB crossings in NL sockets for Core→CHA traversals.

FIG. 3 shows a pre-memory transient address map 300 that will be set up during memory training to guarantee that the CSR accesses in NL sockets are sent only to local CHAs as the BSP thread. This is a pre-memory transient address map will be active only during the Memory Training phase. After memory is trained, the system address map will be reconfigured to match legacy convention.

As before, pre-memory transient address map 300 includes an SNC mapping for non-legacy socket 1 column 202, an SNC mapping for legacy socket 0 column 204, and an overall system view column 206. Also as before, there are three system virtual memory range; however, the ranges above 4 GB have been changed (relative to those shown pre-MRC system address map 200 of FIG. 2. As shown in a cell 302, the 3.5 TB-4 TB range is used as the MMIO high range for all sockets is now 3.5 TB-4 TB. As shown in a cell 304, the memory range from 4 GB-3.5 TB is initially unmapped. As shown in a cell 306, the memory range from 0-4 GB is the legacy range.

Also as before, S0 Ubox CSR range 216 is located within the 0-4 GB legacy range. However, under the solution S1 Ubox CSR range 214 is moved from the 0-4 GB legacy range to the 3.5 TB-4 TB MMIO high range, as shown in cell 302. This results in the following mappings.

As shown in a cell 302, [3.5 TB-4 TB] is the newly programmed [S1, SNC Cluster 0] range from socket 1's point of view. As a result, any access by the BSP residing in [S1, SNC Cluster 0] to this range will be affinitized and does not cause any EMIB Crossings. As shown in a cell 310, NS socket S1 will consider any memory access request in the range from 0-3.5 TB to be an access to remote memory. Hence, any access by the BSP in NL socket S1 to this range will be hashed across all CHAs, resulting in EMIB crossings.

SNC mapping for legacy socket 0 column 204 shows the SNC mappings from legacy socket 0's point of view. As shown in a cell 312, the address range from 3.5 TB-4 TB is an unmapped range for legacy socket 0. As a result, any access by the BSP residing in [S0] will be hashed across all CHA's and result in EMIB Crossings. Conversely, the memory range from 0-3.5 TB is in SNC cluster 0 for legacy socket 0. Accordingly, any access by BSP core in [S0, SNC Cluster 0] to [0-3.5 TB] range will be affinitized and does not cause any EMIB crossings that would result from sending transactions to CHAs that are on core dielets other than the core dielet for the BSP core.

Figure 4:
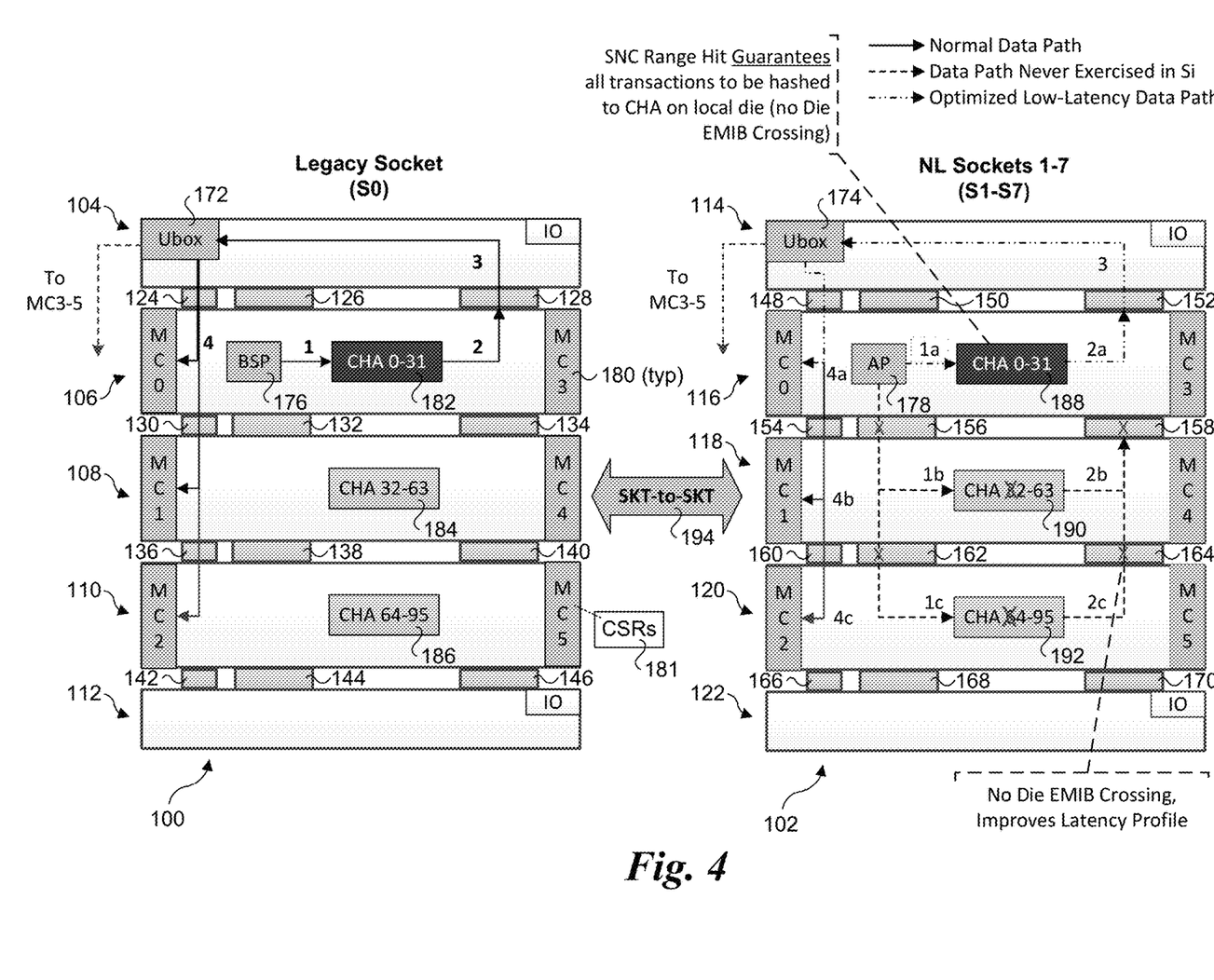
FIG. 4 shows an augmented version of the multi-socket platform of FIG. 1 under which EMIB crossings for BSP core-to-CHA forwarding paths are avoided.

The effects of these changes are shown in FIG. 4, where components and datapaths in FIGS. 1 and 4 with like-numbered references have similar structures and perform similar functions. For the pre-memory CSR programming, the operations performed by legacy socket S0 are the same as described above in FIG. 1. However, the operations performed by NL socket 1 and, optionally, any other NL sockets utilized by the platform, are different in FIG. 4 than they were in FIG. 1.

Since the S1 Ubox CSR range 214 is wholly within the SNC range for NL socket S1, every CSR access resulting from NC transactions issued from AP 178 is guaranteed to be an SNC range "Hit". Therefore, all the NC CSR transactions in NL Socket are hashed/sent to CHA0-31 only, due to Core→CHA affinity that the silicon guarantees. Since there are no transactions that are sent to CHAs 190 (e.g., CHA 32-63) or CHAs 192 (e.g., CHA 64-95) for these accesses, two or four additional round-trip EMIB crossings per NC transaction are avoided, depending on the specific register address being accessed. Thus, all NC transactions issued by AP 178 will be hashed to a CHA within CHAs 188 (e.g., CHA 0-31 in the illustrated embodiment).

Datapaths 1b, 1c, 2b, and 2c for NL Sockets S1-S7 are marked with an 'X' indicating these paths are not exercised during pre-memory CSR programming. Likewise, the NC transactions issued by AP 178 are not accessed to any CHA belonging to CHAs 190 or CHAs 192, which are also marked with an 'X'. As a result, the die EMIB crossings present in FIG. 1 for path segments 1b, 1c, 2b, and 2c are eliminated, improving the latency profile for pre-memory CSR programming. Thus, a low-latency datapath including path segments 1a, 2a and 3 to Ubox 174 will be utilized during programming of the CSRs in memory controllers MC0, MC1, MC2, as well as MC3, MC4, and MC5 for each of the NL sockets 1-7.

Figure 5:
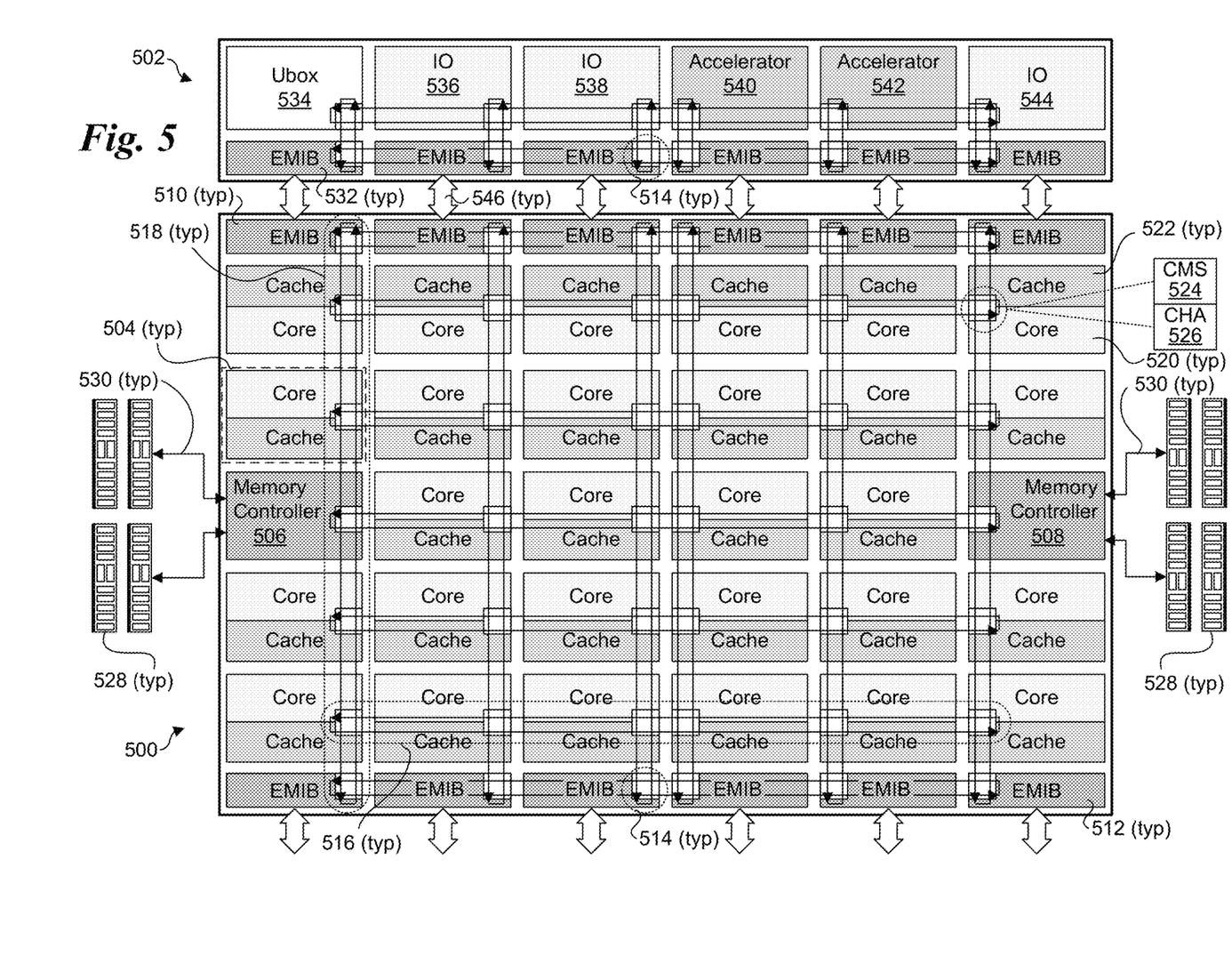
FIG. 5 is a schematic diagram illustrating a core dielet and a first configuration of an IO dielet, according to one embodiment.

FIG. 5 shows examples of a core dielet 500 coupled to an IO dielet 502. Core dielet 500 is composed of multiple core tiles 504, a pair of memory controllers 506 and 508, and upper and lower rows of EMIB blocks 510 and 512 that are arrayed in a grid and coupled to or include an integrated mesh stop 514. Under the illustrated embodiment, the mesh stops are interconnected in each row by a row-wise ring interconnect 516 and in each column by a column-wise ring interconnect 518. Ring interconnects 516 and 518 may be implemented as uni-directional rings (as shown) or bi-directional rings.

Each core tile 504 includes a core 520 and associated caches collectively depicted by cache blocks 522. In one embodiment the associated caches include an L1 cache, an L2 cache or MLC, and an LLC "slice." In one embodiment, the MCL is 2 MB and the LLC slice is 4 MB, but these are merely exemplary and non-limiting sizes. Core tiles 504 also include a core mesh stop (CMS) 524 and a CHA 526. CHAs 526 operate in the manner described above for the CHAs in FIGS. 1 and 4.

When a split-die SoC including core dielet 500 is installed in a platform, each of memory controllers 506 and 508 will be connected to one of more memory devices such as illustrated by DIMMs (Dual In-line Memory Modules) 528 via one or more memory channels 530. Generally, DIMMs may be any current or future type of DIMM such as DDR5 DIMMs. Alternatively, or in addition to, NVDIMMs (Non-volatile DIMMs) may be used, such as but not limited to Intel® 3D-Xpoint® NVDIMMs.

IO dielet 502 includes a row of EMIB blocks 532, a Ubox tile 534, IO tiles 536, 538, and 544, and a pair of accelerator tiles 540 and 542. As with core dielet 500, the tiles and EMIB blocks are array in a grid with each of the tiles and EMIB blocks coupled to or including an integrated mesh stop 514. Also as above, the mesh stops are interconnected in each row and each column by respective uni-directional or bi-directional ring interconnects.

Generally, IO tiles are representative of various types of IO components that are implemented on SoCs, such as Peripheral Component Interconnect (PCIe) IO components, Compute Express Link (CXL) components, High-Bandwidth Memory (HBM) interfaces, storage device IO controller (e.g., SATA, PCIe), high-speed interfaces such as DMI (Direct Media Interface), Low Pin-Count (LPC) interfaces, Serial Peripheral Interface (SPI), enhanced SPI (eSPI) etc. Under some embodiments, a PCIe IO tile may include a PCIe root complex and one or more PCIe root ports. The IO tiles may also be configured to support an IO hierarchy (such as but not limited to PCIe), in some embodiments.

Accelerator tiles 540 and 542 are illustrative of various types of accelerators that may be included in an IO dielet, such as Field Programmable Gate Arrays (FPGAs), encryption/decryption engines, compression/decompression engines, etc. Generally, an IO dielet may or may not include any accelerator tiles. As another option, a core dielet may include one or more accelerator tiles (not shown).

Figure 6:
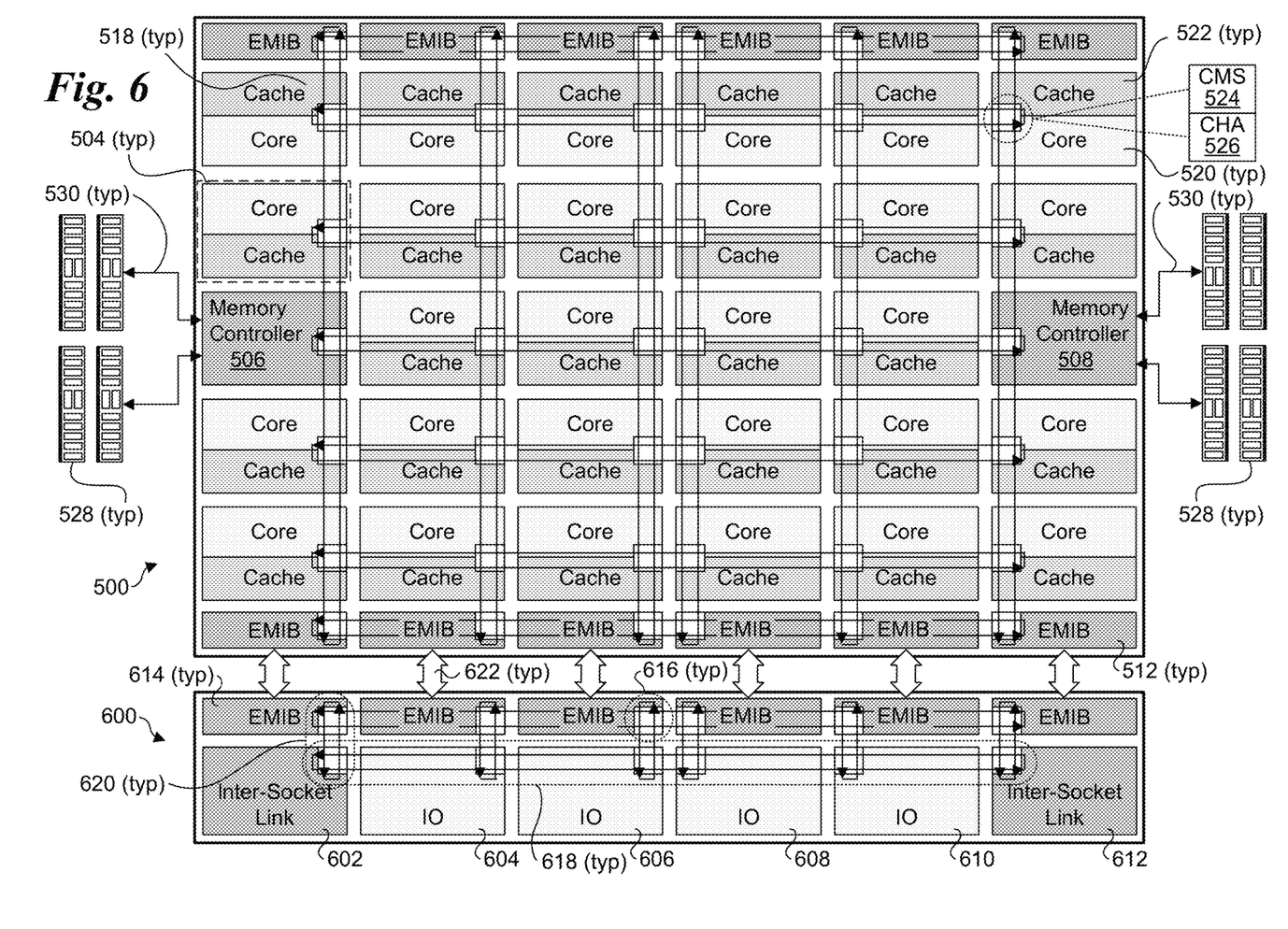
FIG. 6 is a schematic diagram illustrating the core dielet of FIG. 5 and a second configuration of an IO dielet, according to one embodiment.

EMIB blocks 510, 512, and 532 are used to implement embedded interconnect bridges that facilitate communication between dialets. The interconnect paths 546 correspond to the EMIB crossings described and illustrated above. Each EMIB block will include ingress and egress buffers and/or queues in a manner similar to various types of IO interfaces. In one embodiment, the EMIB blocks implement the same protocol(s) as the ring interconnects.

Mesh stops may also be referred to as mesh stop nodes and are somewhat similar to ring stop nodes in ring interconnect architectures. Mesh stops are "steerable," meaning a given message or packet may arrive at a mesh stop and be forwarded along the same direction as the receive path or forwarded along a path the is perpendicular to the receive path. For example, a message of packet may be received via a horizontal path (via a row-wise ring interconnect segment) and be forwarded to a next mesh stop via a vertical path (comprising a column-wise ring interconnect segment).

During a given "stop" cycle, a next mesh stop (along a forwarding path) may or may not be available. While use of mesh stops (and the associated ring interconnects) within a dielet may be fairly coordinated to effect efficient forwarding, this may not be the case for forwarding traffic between dielets. This results in additional latency that may be occurred when forwarding a message or packet via an EMIB crossing, which may have to wait one or more additional cycles.

FIG. 6 shows a second example of an IO dielet 600 coupled to core dielet 500. IO dielet 600 includes intersocket link tiles 602 and 612, four IO tiles 604, 606, 608, and 610 and a row of EMIB blocks 614 arrayed in a grid, with each tile or block including a mesh stop 616. As before, the mesh stops are connected via row-wise ring interconnects 618 and column-wise ring interconnects 620. Respective pairs of EMIB blocks 614 on IO dielet 600 are coupled to EMIB blocks 512 on core dielet 500, as depicted by EMIB crossings 622.

Inter-socket link tiles 602 are configured to facilitate socket-to-socket interconnects (aka links), using one of the interconnect structures and protocols discussed above for socket-to-socket link 194. Generally, under different socket-to-socket interconnect structures, a given socket may be connected to two or more other sockets. To support additional socket-to-socket interconnects, either an IO dielet may include additional inter-socket link tiles or each of the IO dielets for a socket may include inter-socket link tiles.

Figure 7:
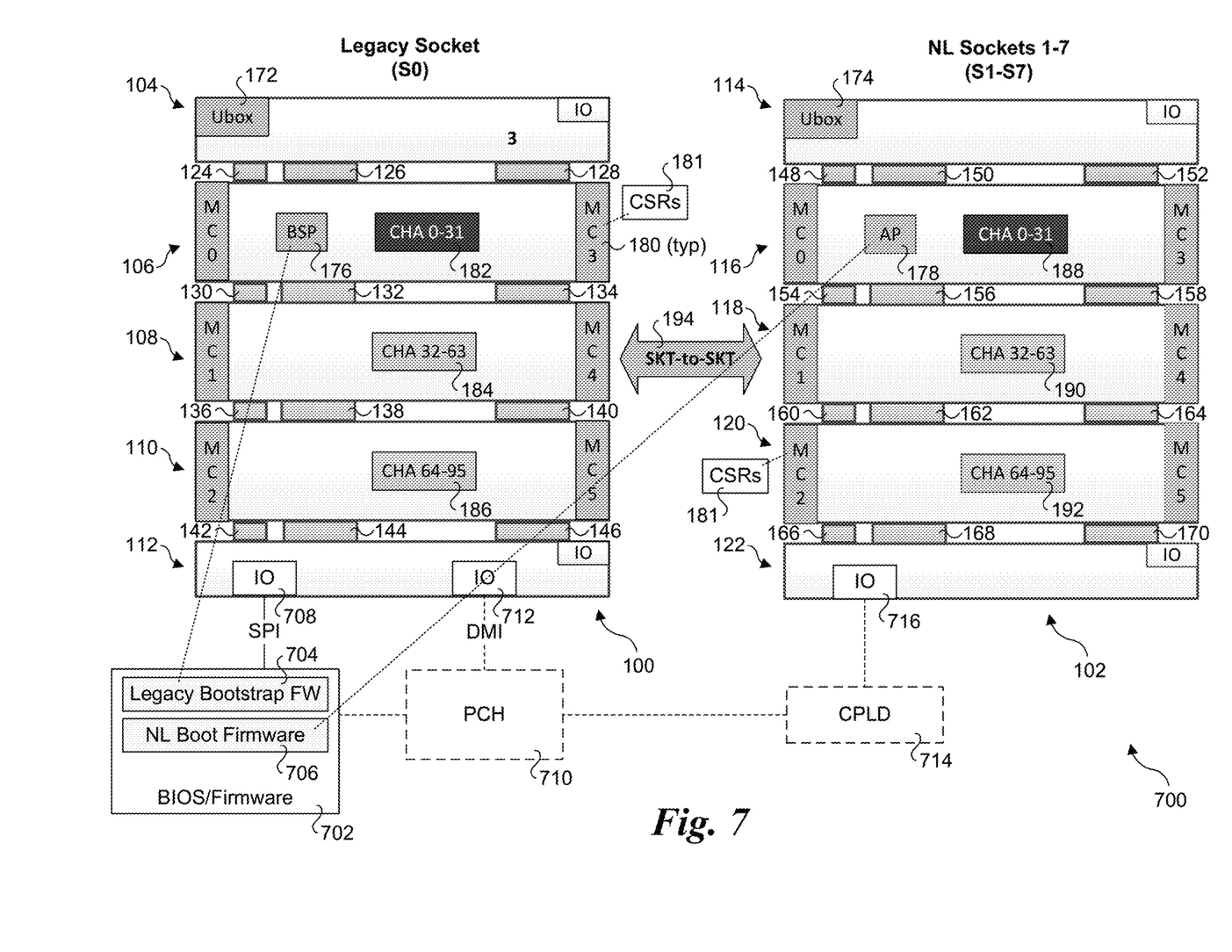
FIG. 7 is an abstracted view of a multi-socket platform under which aspects of the embodiments disclosed herein may be implemented.

FIG. 7 shows a multi-socket compute platform 700 including a legacy socket 100 and one or more NL sockets 102 and a firmware device 702 in which BIOS and firmware are stored. BSP 176 on the legacy socket 100 is used to boot the legacy socket and configure various platform components. This includes creating pre-memory transient address map 300 of FIG. 3. The boot operations are enabled, in part, via execution of legacy bootstrap firmware 704, which is loaded into a protected region of memory and executed by BSP 176 in conjunction with booting platform 700. Legacy bootstrap firmware 704 is also executed on BSP 176 to program the memory controller MSRs 181 for the legacy socket.

The BIOS/firmware stored in firmware device 702 also includes non-legacy boot firmware 706, which is executed by AP 178 on the one or more non-legacy sockets 102 to boot the NL sockets. This includes programming the memory controller CSRs 181 on each of the NL sockets in the manner described above.

As further shown in FIG. 7, the BIOS/firmware in firmware device 702 may be accessed via various means, depending on the particular platform architecture. For example, in one embodiment firmware device 702 is connected in an IO interface implemented by an IO tile 708 in IO dielet 112. For example, an SPI or eSPI link may be coupled between firmware device 702 and an SPI or eSPI interface implemented in IO tile 708.

In some platforms, a platform control hub (PCH) may be used. In the illustrated embodiment, an optional PCH 710 is connected to an interface in an IO tile 712 using a DMI link. In yet other configurations, a CPLD (complex programmable logic device) 714 is used in combination with PCH 710, or may be used in combination with a second PCH (not shown) that is implemented as an IO expander. Generally, CPLD 714 may be programmable logic device with sufficient functionality, or may be implemented as an FPGA. CPLD 714 is connected to IO dielet 122 via a suitable link and IO interface implemented in an IO tile 716.

The embodiments of the methods and platforms disclosed herein provide significant advantages. For example, reduction in Cold Boot time. As discussed above, for one SoC under development the DDR5 training has been observed to make 1 Billion+CSR accesses. The methods provide herein reduce average CSR Access latency by 120 ns (700 ns→580 ns), translating to 2 minutes (120 seconds) of Cold Boot time improvement. The approaches also improve product costs using High Volume Manufacturing (HVM)/System Test Cost Reduction (PPV): Due to Boot Time improvements, non-trivial cost savings can be realized, resulting in improved product cost.

In addition to local memory, some implementations may be deployed in a disaggregated architecture where some memory resources are separate form the platform. For instance, such disaggregated architectures may employ multiple levels of memory in a hierarchy, with local (e.g., accessed by memory controllers on sockets) memory being a one level and memory external to the platform being at another level. In some embodiments the local memory is termed "near" memory, and the external memory is termed "far" memory. In other cases, the memory may reside in a PCIe or CXL card that is installed in an expansion slot in the platform. Since this memory is not accessed by a memory controller on a socket, it is considered to be in a memory tier separate from the local memory.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding firmware components such as BIOS and/or firmware executed on a core such as but not limited to a BSP core. Thus, embodiments of this invention may be used as or to support firmware and/or firmware modules, executed upon some form of processor core or embedded logic or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by firmware running on a processing element, via embedded hardware or the like, or any combination of hardware and firmware. Such components may be implemented as firmware modules, hardware modules, special-purpose hardware (e.g., application specific hardware, ASICs, DSPs, etc.), embedded controllers, hardwired circuitry, hardware logic, etc. Firmware content (e.g., data, instructions, configuration information, etc.) may be provided via an article of manufacture including non-transitory computer-readable or machine-readable storage medium, which provides content that represents instructions that can be executed. The content may result in a computer/platform/server etc. performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented on a multi-socket platform comprising a plurality of sockets including a legacy socket and one or more non-legacy sockets, each of the legacy and non-legacy sockets comprising a split-die System-on-Chip (SoC) including a plurality of dielets interconnected with a plurality of embedded interconnect bridges connecting multiple dies, wherein the plurality of dielets include at least two core dielets having a plurality of cores, a plurality of cache controllers, and one or more memory controllers coupled to system memory, the method comprising:

accessing, on a non-legacy socket, control and status registers (CSRs) residing in the one or more memory controllers on the at least two core dielets using a plurality of transactions originating from a first core on a first core dielet of the at least two core dielets, wherein the plurality of transactions are forwarded via core-to-cache controller datapaths that do not cross an embedded interconnect bridges connecting multiple dies.

2. The method of claim 1, further comprising:
creating a transient map of address ranges for the system memory to be employed during memory training, wherein the map includes a legacy range and a Memory-Mapped Input Output (MMIO) range; and
storing a range of MMIO CSR addresses for the non-legacy socket in the MMIO range,
wherein the CSRs the one or more memory controllers on the at least two core dielets are programmed using transactions having addresses within the range of MMIO CSR addresses for the non-legacy socket.

3. The method of claim 2, further comprising:
for each of the non-legacy sockets,
storing a range of MMIO CSR addresses for the non-legacy socket in the MMIO range; and
accessing CSRs in the one or more memory controllers on the at least two core dielets of the non-legacy socket using transactions having addresses within the range of MMIO CSR addresses for the non-legacy socket.

4. The method of claim 1, wherein the cache controllers are configured to implement memory coherency and enabled to detect coherent and non-coherent memory transactions, and wherein the transactions comprise non-coherent (NC) transactions, further comprising:
hashing a CSR address in an NC transaction to identify a cache controller on the first core dielet to handle the NC transaction;
forwarding the NC transaction to the cache controller that is identified;
identifying the transaction is an NC transaction; and
forwarding the NC transaction from the cache controller that is identified to an agent on the non-legacy socket configured to handle NC transactions.

5. The method of claim 1, further comprising:
identifying, using the CSR address, a memory controller having the CSR to be programmed; and
forwarding the NC transaction from the agent on the non-legacy socket configured to handle NC transactions to the memory controller that is identified.

6. The method of claim 1, wherein the platform includes a plurality of non-legacy sockets, and wherein the method is performed for accessing CSRs in the memory controllers for the plurality of non-legacy sockets.

7. The method of claim 1, wherein the platform employs a Non-Uniform Memory Access (NUMA architecture), further comprising:
creating a transient map of address ranges for the system memory to be employed during memory training, wherein the map includes a Sub-NUMA Cluster (SNC) range allocated for the non-legacy socket; and
storing a range of CSR addresses for accessing CSRs in the memory controllers for the non-legacy socket in the Sub-NUMA Cluster (SNC) range,
wherein every transaction used to access a CSR in the memory controllers is guaranteed to be an SNC range hit such that the transaction is sent to only cache controllers on the first core dielet.

8. The method of claim 1, wherein the first core on the first core dielet operates as a bootstrap processor (BSP), and the transactions are generated via execution of a bootstrap portion of BIOS on the BSP as part of performing memory initialization for the non-legacy socket.

9. A multi-socket compute platform comprising:
system memory, comprising a plurality of memory devices; and
a plurality of sockets including a legacy socket and one or more non-legacy sockets, each socket comprising,
a split-die System-on-Chip (SoC) including a plurality of dielets interconnected with a plurality of embedded interconnect bridges connecting multiple dies, wherein the plurality of dielets include at least two core dielets having a plurality of cores, a plurality of cache controllers, and one or more memory controllers, each memory controller coupled to at least one of the plurality of memory devices; and
system firmware configured to be executed on one or more cores in the legacy socket and a non-legacy socket to access control and status registers (CSRs) residing in the one or more memory controllers on the at least two core dielets on the non-legacy socket using a plurality of transactions originating from a first core on a first core dielet of the at least two core dielets, wherein the plurality of transactions are not forwarded along any core-to-cache controller datapaths that cross an embedded interconnect bridges connecting multiple dies.

10. The multi-socket compute platform of claim 9, wherein a first portion of the system firmware is configured to be executed on a core in the legacy socket to:
create a transient map of address ranges for the system memory to be employed during memory training, wherein the map includes a legacy range and a Memory-Mapped Input Output (MMIO) range; and
store a range of MMIO CSR addresses for the non-legacy socket in the MMIO range,
wherein the CSRs for the one or more memory controllers on the at least two core dielets are programmed using transactions having addresses within the range of MMIO CSR addresses for the non-legacy socket, and wherein the transactions are generated by executing a second portion of the system firmware on a core in the non-legacy sockets.

11. The multi-socket compute platform of claim 10, wherein execution of system firmware is configured to:
for each of the non-legacy sockets,
store a range of MMIO CSR addresses for the non-legacy socket in the MMIO range; and
access CSRs in the one or more memory controllers on the at least two core dielets of the non-legacy socket using transactions having addresses within the range of MMIO CSR addresses for the non-legacy socket.

12. The multi-socket compute platform of claim 9, wherein the non-legacy socket includes an agent configured to handle non-coherent transactions, wherein the transactions comprise non-coherent (NC) transactions, and wherein the non-legacy socket is configured to:
hash a CSR address in an NC transaction to identify a cache controller on the first core dielet to handle the NC transaction;
forward the NC transaction to the cache controller that is identified; and
forward the NC transaction from the cache controller that is identified to the agent configured to handle NC transactions.

13. The multi-socket compute platform of claim 12, wherein the agent configured to handle NC transactions is configured to:
identifying, using the CSR address in the NC transaction, a memory controller having the CSR to be programmed; and
forward the NC transaction to the memory controller that is identified.

14. The multi-socket compute platform of claim 9, wherein the compute platform employs a Non-Uniform Memory Access (NUMA architecture), and wherein a first portion of the system firmware is configured to be executed on a core in the legacy socket to:
create a transient map of address ranges for the system memory to be employed during memory training, wherein the map includes Sub-NUMA Cluster (SNC) range allocated for the non-legacy socket; and
store a range of CSR addresses for accessing CSRs in the memory controllers for the non-legacy socket in the SNC range, wherein every transaction used to access a CSR in the memory controllers for the non-legacy socket is guaranteed to be an SNC range hit such that the transaction is sent to only cache controllers on the first core dielet.

15. The multi-socket compute platform of claim 14, wherein the platform includes a plurality of non-legacy sockets, and wherein execution of the first portion of the system firmware on the core in the legacy socket causes the legacy socket to:
    allocate a respective SNC range for each of the plurality of non-legacy sockets and include the respective SNC ranges in the transient map of address ranges for the system memory to be employed during memory training,
    store, for each non-legacy socket, a range of CSR addresses for accessing CSRs in the memory controllers for the non-legacy socket within the SNC range allocated for the non-legacy socket.

16. A non-transitory machine-readable medium having firmware instructions stored therein configured to be executed on one or more cores in a legacy socket and a non-legacy socket in a multi-socket platform comprising a plurality of sockets including the legacy socket and one or more non-legacy sockets, each of the legacy and non-legacy sockets comprising a split-die System-on-Chip (SoC) including a plurality of dielets interconnected with a plurality of embedded interconnect bridges connecting multiple dies, wherein the plurality of dielets include at least two core dielets having a plurality of cores, a plurality of cache controllers, and one or more memory controllers coupled to system memory, wherein execution of the instructions access control and status registers (CSRs) residing in the memory controllers on the non-legacy socket using a plurality of transactions originating from a first core on a first core dielet of the at least two core dielets in the non-legacy socket, and wherein the plurality of transactions are not forwarded along any core-to-cache controller datapaths that cross an embedded interconnect bridges connecting multiple dies.

17. The non-transitory machine-readable medium of claim 16, wherein a first portion of the firmware instructions is configured to be executed on a core in the legacy socket to:
    create a transient map of address ranges for the system memory to be employed during memory training, wherein the map includes a legacy range and a Memory-Mapped Input Output (MMIO) range; and
    store a range of MMIO CSR addresses for the non-legacy socket in the MMIO range,
    wherein the CSRs for the one or more memory controllers on the at least two core dielets are programmed using transactions having addresses within the range of MMIO CSR addresses for the non-legacy socket.

18. The non-transitory machine-readable medium of claim 17, wherein execution of the firmware instructions cause the multi-socket compute platform to:
    for each of the non-legacy sockets,
        store a respective range of MMIO CSR addresses for the non-legacy socket in the MMIO range; and
        access CSRs in the one or more memory controllers on the at least two core dielets of the non-legacy socket using transactions having addresses within the range of MMIO CSR addresses for the non-legacy socket.

19. The non-transitory machine-readable medium of claim 16, wherein the multi-socket compute platform employs a Non-Uniform Memory Access (NUMA architecture), and wherein a first portion of the firmware instructions is configured to be executed on a core in the legacy socket to:
    create a transient map of address ranges for the system memory to be employed during memory training, wherein the map includes Sub-NUMA Cluster (SNC) range allocated for the non-legacy socket; and
    store a range of CSR addresses for accessing CSRs in the memory controllers for the non-legacy socket in the SNC range,
    wherein every transaction used to access a CSR in the memory controllers for the non-legacy socket is guaranteed to be an SNC range hit such that the transaction is sent to only cache controllers on the first core dielet.

20. The non-transitory machine-readable medium of claim 19, wherein the platform includes a plurality of non-legacy sockets, and wherein execution of the first portion of the system firmware on the core in the legacy socket causes the legacy socket to:
    allocate a respective SNC range for each of the plurality of non-legacy sockets and include the respective SNC ranges in the transient map of address ranges for the system memory to be employed during memory training; and
    store, for each non-legacy socket, a range of CSR addresses for accessing CSRs in the memory controllers for the non-legacy socket within the SNC range allocated for the non-legacy socket.

* * * * *